(No Model.) 2 Sheets—Sheet 2.
C. EWING.
COLLAR STUFFING MACHINE.
No. 305,166. Patented Sept. 16, 1884.
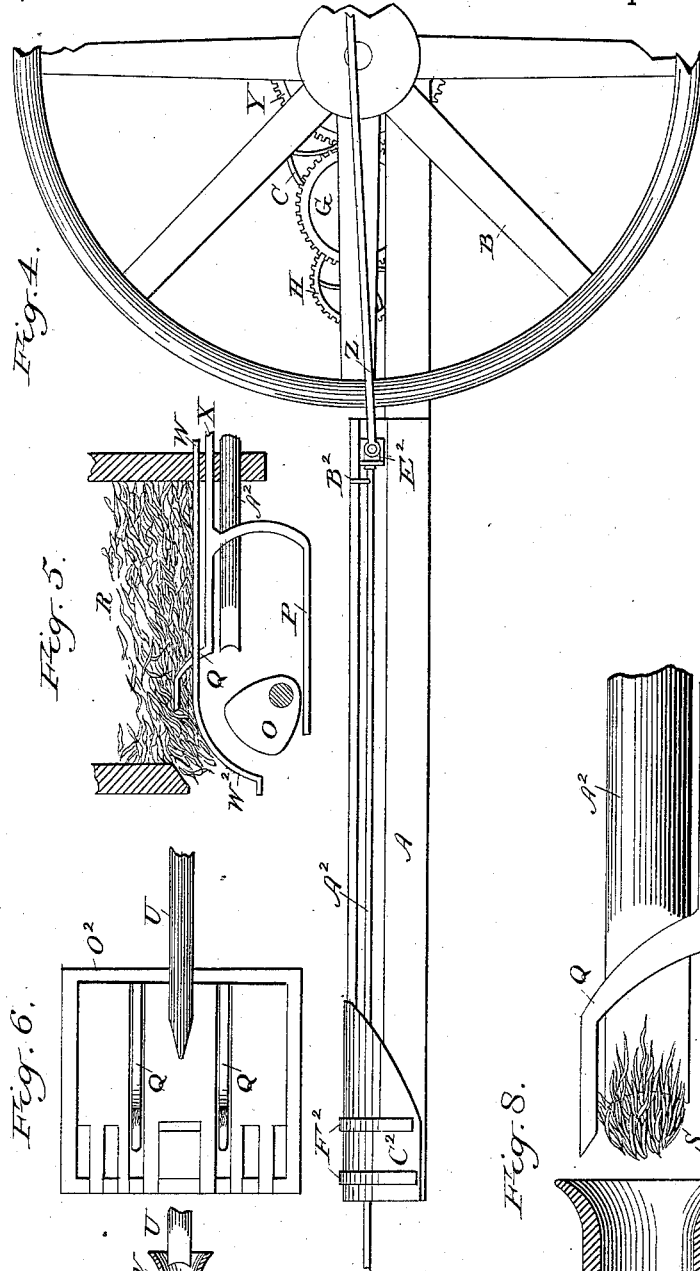
Witnesses:
N. A. Brann
L. E. Redstone
Inventor:
Calvin Ewing
By J. H. Redstone
Atty in Fact

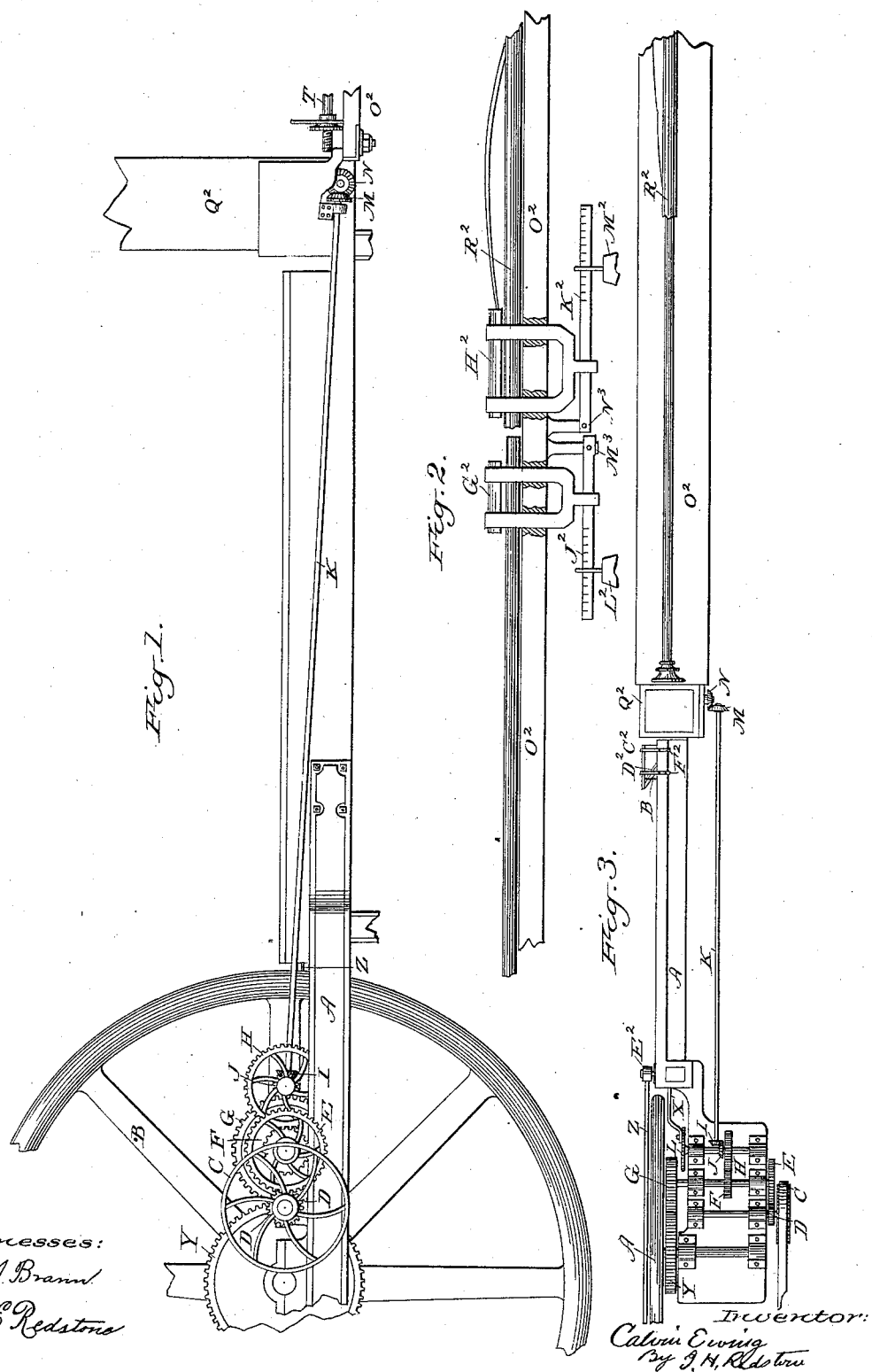

UNITED STATES PATENT OFFICE.

CALVIN EWING, OF SAN FRANCISCO, CALIFORNIA.

COLLAR-STUFFING MACHINE.

SPECIFICATION forming part of Letters Patent No. 305,166, dated September 16, 1884.

Application filed November 3, 1883. (No model.)

*To all whom it may concern:*

Be it known that I, CALVIN EWING, a citizen of the United States, residing in the city and county of San Francisco, and State of California, have invented a new and useful Collar-Stuffing Machine, of which the following is a specification.

My invention relates to improvements in "collar-stuffing machines," in which a stuffing-tube is employed by inserting in the rim or tube of the collar and allowing the shuttle or stuffing-rod to pass in and deposit the wad or filling at the end of the tube at each motion as the rod is reciprocated.

My invention will be more fully understood by reference to the accompanying drawings, in which Figures 1 and 2 are side elevations showing broken parts. Fig. 3 is a plan view of the same as Fig. 1. Fig. 4 is a side elevation of the same broken part shown in Fig. 1. Fig. 5 is a broken section showing the bottom of the supply-hopper or feed-box, with the rake and operating-cam and the feed or stuffing rod. Fig. 6 is an under plan view of the feed-hopper and the stuffing-rod passing forward to take the charge or bundle from the rake. Fig. 7 shows the stuffing-rod turned quarter round and passing into the stuffing-tube, and Fig. 8 shows an enlarged broken view of the stuffing-rod and the rake.

A represents the frame of the machine; B, the balance-wheel; C, the driving-pulley; D, the spur-pinion which operates the spur-wheel E, which is upon the same shaft with and operates the spur-wheels F and G. The spur-wheel F gears with and operates the spur-wheel H, which is upon the same shaft with and operates the miter-pinion J and the face-plate or crank-wheel L. The miter-pinion J operates the miter-pinion I, which is attached to and gives motion to the shaft K, which operates the miter-pinion M, which gears with and operates the pinion N and cam O, which operates the rake-yoke P and the rake Q. (Shown in Fig. 5.) The crank-wheel or face-plate L operates the rake-connecting rod X. (Shown in Figs. 3 and 5.) The spur-wheel G gears with and operates the spur-wheel Y, which is upon the same shaft with and operates the fly-wheel B. The fly-wheel B operates the connecting-rod Z, which connects with the stuffing-rod $A^2$. The guide-pin $B^2$ operates in the guide-plate $C^2$ in the guide slot $D^2$. The connecting-rod Z is connected at the block or cross-head $E^2$. The stuffing-rod $A^2$ is connected with the cross-head $E^2$ by a swivel-joint, which allows it to revolve. The guide-plate $C^2$ is attached by straps $F^2$ to the frame A.

$O^2$ represents the extension of the frame A, and is designed to hold the collar $R^2$ while it is being stuffed.

The clamp $G^2$ is designed to clamp the collar rim or tube $R^2$ to regulate the tension, and the guide-clamp $H^2$ serves as a guide to hold the collar in line and prevent its curving after it has passed off the tube T.

The weights $L^2$ and $M^2$ regulate the pressure for the clamps $G^2$ and $H^2$ by means of the levers $J^2$ and $K^2$.

The following is the construction of my improved collar-stuffing machine.

I construct the frame A of metal and the extension $O^2$ of wood, generally of oak, about three inches thick and of sufficient width to receive the collar when stuffing.

The fly-wheel B is sufficiently large to give a five-foot stroke to the stuffing-rod $A^2$ by means of the pitman or connecting rod Z.

The tube T is made interchangeable, as the size may vary according to the rim or tube of the collar. I generally form it of the metal that is most easily kept clean and bright.

The stuffing-rod U, I generally construct of steel, tapering at the point, so as to withdraw freely after depositing the wad or stuffing. I flatten it and curve or hollow the end, so as to hold the wad, as shown in Fig. 8 at S.

I construct the guide-plate $C^2$ of metal, and conform the surface to the radius described by the pin $B^2$ when the stuffing-rod $A^2$ is revolved.

The following is the operation of the machine: The collar is placed upon the tube T, the tube extending to near the end of the same when opened out, making a length of something like five feet to be stuffed or filled. The clamp G is brought down upon the rim of the collar, and the pulley C, being revolved, revolves the spur-wheel D, revolving the spur-wheels E, F, and G. The spur-wheel G revolves the spur-wheel Y, which is upon the same shaft as the fly-wheel B, and consequently revolves the same. As the fly-wheel B is revolved, the connecting-rod Z forces the stuffing-rod $A^2$ forward. At the same time the spur-wheel H, being revolved, revolves the face-plate or crank-wheel L and carries forward the rake-rod X and rake Q, taking a bundle which forms the wad. At the same time the miter-pinions J, I, M, and N are revolved, revolving the cam O, and the rake Q carries down the wad or bundle to the point $W^2$, where the stuffing-rod U takes it into the tube T, through the same into the rim of the collar. Before reaching the end of the stroke the pin $B^2$ passes into the groove $D^2$, and the rod T receives a twist or turn about one-quarter revolution. The pressure of the clamp $G^2$ affords friction sufficient to hold the collar and allow it to be stuffed as hard as desired, or it may be increased by adding additional friction by means of the weighted lever $L^2$. (Shown in Fig. 2.) The clamp $H^2$ is simply a guide-clamp, and serves to keep the collar straight after it passes out beyond the stuffing-tube. As the fly-wheel B continues to revolve, the stuffing-rod $A^2$ is withdrawn and returned to its former position by means of the groove $D^2$ in the guide-plate $C^2$, thus alternating and taking a wad and placing the same in the rim of the collar at each revolution. The straw is cut to the required length and placed in the feed-box $Q^2$, where it is fed down to the rake Q by its own gravity.

This machine may be readily operated by hand, although I prefer operating it by power and increasing the speed to the full capacity of the straw to stand without breaking.

Having thus described my invention, what I claim, and desire to secure by Letters Patent, is—

1. In collar-stuffing machines, the fly-wheel B and connecting-rod Z, in combination with the stuffing-rod $A^2$, guide-plate $C^2$, having the slot $D^2$, and operating through the tube T, constructed and operated substantially as and for the purposes set forth.

2. In collar-stuffing machines, the rake Q, in combination with the stuffing-rod $A^2$, to operate for the purpose of separating the wad or bundle and passing the same through the tube T, substantially as and for the purposes set forth.

3. In collar-stuffing machines, the miter-gear J, I, M, and N, cam O, rake Q, and yoke P, in combination with the stuffing-rod $A^2$, constructed substantially as and for the purposes set forth.

4. In collar-stuffing machines, the stuffing-tube T, in combination with the stuffing-rod $A^2$, having guide-pin $B^2$, to operate in the guide-slot $D^2$, constructed and operated substantially as and for the purposes set forth.

CALVIN EWING.

Witnesses:
JAMES MASON,
JOHN H. REDSTONE.